United States Patent [19]

Inoue et al.

[11] Patent Number: 5,118,771

[45] Date of Patent: Jun. 2, 1992

[54] ERASABLE OPTICAL DISK HAVING AN IMPROVED OPTICALLY TRANSPARENT SUBSTRATE

[75] Inventors: Takao Inoue; Takahiro Matsuo, both of Osaka, Japan

[73] Assignee: Matsushita Electric Industrial Co., Ltd., Osaka, Japan

[21] Appl. No.: 24,599

[22] Filed: Mar. 9, 1987

[30] Foreign Application Priority Data

Mar. 7, 1986 [JP] Japan ............................ 61-51136
May 30, 1986 [JP] Japan ............................ 61-126104

[51] Int. Cl.$^5$ .............................................. C08F 22/40
[52] U.S. Cl. ........................................ 526/262; 526/321
[58] Field of Search ................................ 526/321, 262

[56] References Cited

U.S. PATENT DOCUMENTS

| | | | |
|---|---|---|---|
| 3,634,379 | 1/1972 | Hauser | 526/321 |
| 3,640,983 | 2/1972 | Horiguchi et al. | 526/321 |
| 3,663,467 | 5/1972 | Albright | 526/321 |
| 4,427,760 | 1/1984 | Nagazawa et al. | 522/109 |
| 4,555,449 | 11/1985 | Koleske et al. | 428/411.1 |
| 4,591,626 | 5/1986 | Kawai et al. | 526/282 |
| 4,592,939 | 6/1986 | Temple et al. | 428/64 |
| 4,734,477 | 3/1988 | Inoue et al. | 526/320 |

FOREIGN PATENT DOCUMENTS

| | | |
|---|---|---|
| 3333969 | 3/1984 | Fed. Rep. of Germany . |
| 3337890 | 5/1985 | Fed. Rep. of Germany . |
| 2130423 | 5/1984 | United Kingdom . |
| 2149414 | 5/1985 | United Kingdom . |

OTHER PUBLICATIONS

CA 107(6): 41274P, Matsuo et al., Nov. 26, 1986, "Heat-Resistant Resins".

*Primary Examiner*—Joseph L. Schofer
*Assistant Examiner*—N. Sarofim
*Attorney, Agent, or Firm*—Lowe, Price, LeBlanc & Becker

[57] ABSTRACT

An erasable optical disk having a grooved substrate which is made of a cured polymer product formed by radical polymerization of a composition comprising a specific type of (meth)acrylate compound alone or in combination with at least one compound selected from N-substituted maleimide compounds and epoxy-novolac (meth)acrylate compounds. The substrate has a good heat resistance, a good transparency, and can be produced at a high productivity.

11 Claims, 1 Drawing Sheet

ERASABLE OPTICAL DISK HAVING AN IMPROVED OPTICALLY TRANSPARENT SUBSTRATE

BACKGROUND OF THE INVENTION

1. Field of the Invention

This invention relates to erasable optical disks of the type in which information is recorded, reproduced and/or erased by the use of laser beams and more particularly, to an improvement in optically transparent substrates of cured resin products useful for the optical disks. The invention also relates to the cured resin products of reactive compound compositions.

2. Description of the Prior Art

As is well known in the art, a typical optical recording disk includes an optically transparent substrate having a spiral groove or concentric grooves on one side thereof and a recording film formed on the grooved surface by evaporation or sputtering. When a laser beam is irradiated on the recording film through a groove-free side according to information signals, a phase change takes place in the film where irradiated. The information signals are recorded as variations in reflectance or transmittance caused by the phase change. The thus recorded information signals can be reproduced by application of a laser beam of a different energy level to the recording film. Similarly, the information signals can be erased by applying a laser beam to the recording film so that the phase change is reversely caused until the reflectance or other characteristics are returned to an original state. For instance, if information signals are recorded by converting the recording film from amorphous to crystalline states at portions irradiated with a laser beam, the signals are erased by conversion to the amorphous state.

In this type of optical disk, a glass substrate is predominantly used as the optically transparent substrate. In some cases, thermoplastic resin substrates are used for this purpose, including a polymethyl methacrylate substrate and a polycarbonate substrate. The polymethyl methacrylate or polycarbonate substrate is advantageous in that it can be fabricated using existing injection molders, thus leading to a high productivity. However, because of the high molecular weight of the resin, it is difficult to completely remove foreign matters from these polymers with a relatively high percent defective. In addition, the birefringence of the substrate cannot be reduced because of the melt flow of polymer molecules during the molding. Moreover, the injection-molded resin substrate has the serious problem that it is not resistant to heat and is not suitable for use as an erasable optical disk which utilizes the phase change of a recording film from crystalline to amorphous states, and vice versa, by application of laser beams. More particularly, when laser beams of different energy levels are repeatedly applied to a recording film formed, for example, on a polycarbonate substrate for repeating recording, reproducing and erasing cycles, the polycarbonate substrate undergoes thermal deformation after only several to several tens repetition cycles. This results in formation of cracks or pinholes in the recording film, making it impossible to continue the recording, reproducing and erasing operations. This is true of a polymethyl methacrylate substrate. Accordingly, the optical disks using these resin substrates cannot be reliably used as an erasable disk, but may be used only as a write-once optical disk.

On the other hand, a photopolymer groove transfer method is known in which a grooved photopolymer is transferred on a glass substrate or an epoxy resin substrate. However, the disks obtained by this method have the drawback that the photopolymer is not resistant to heat. The glass substrate is expensive and presents a cost problem. The epoxy resin substrate is disadvantageous in that it takes a relatively long time for curing, resulting in a poor productivity, and in that the releasing property of the epoxy resin is poor.

In order to set up a standard for the heat resistance of a recording film, we made a computer analysis of an optical disk, with the result that the recording film was heated to a temperature over 200° C. by application of laser beams.

To solve the problem involved in the heat resistance, attempts have been made to form a thermal insulating film of an inorganic material between a resin substrate and a recording film. However, optimum conditions of forming an inorganic film on a polycarbonate or polymethyl methacrylate substrate have not been established yet with respect to a type of apparatus, a technique and a type of inorganic material. In addition, because existing apparatus might not be used for this purpose, plant costs would become high with an increasing cost of the resultant optical disk. Thus, this type of optical disk has not been in use yet.

Accordingly, there is a high demand for an optically transparent resin substrate which has a high heat resistance without the necessity of any inorganic thermal insulating film and which has a reduced birefrigence and can be fabricated while easily removing foreign matters from starting materials.

SUMMARY OF THE INVENTION

It is an object of the invention to provide an erasable optical disk which comprises an optically transparent substrate made of a specific type of resin product cured through crosslinkage whereby the substrate has a significantly improved heat resistance, a reduced birefrigence and a high optical transmittance.

It is another object of the invention to provide an erasable optical disk which can be simply manufactured by a small-sized disk molding system suitable for operation in a clean room.

It is a further object of the invention to provide an erasable optical disk which has a simple construction without use of any thermal insulating film between a substrate and a recording layer and which has high productivity and reliability with low production costs.

It is a still further object of the invention to provide an erasable optical disk whose substrate is made of a polymer resin but has a heat resistance sufficient to prevent formation of cracks or pinholes in a recording film as will be caused by thermal deformation of the substrate by application of laser beams.

The above objects can be achieved, according to the invention, by a recording and erasing optical disk which comprises an optically transparent substrate of a disk form having a grooved surface on one side of the substrate, and a recording film formed at least on the grooved surface of the substrate. The present invention is characterized in that the optically transparent substrate is made of a cured polymer or resin product of a composition which comprises: (A) an acrylate or methacrylate compound of the following general formula (I),

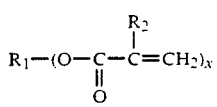

in which $R_1$ represents an alcohol residue having from 2 to 50 carbon atoms, each $R_2$ represents a hydrogen atom or a methyl group, and x is an integer of from 2 to 6;

(B) up to 40 wt %, based on the total amount of the compounds of (A) and (B), of at least one compound selected from the group consisting of N-substituted maleimide compounds of the following general formula (II) and epoxynovolac methacrylate/acrylate compounds of the following general formula (III)

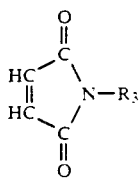

in which $R_3$ represents a cyclohexyl group, a lauryl group, a 2,6-diethylphenyl group, an o-chlorophenyl group or a phenyl group,

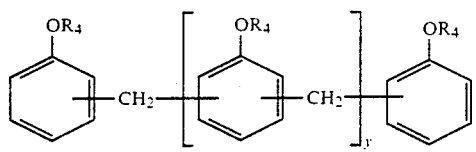

in which each $R_4$ represents a group of the formula and y is an integer of 3 or 4

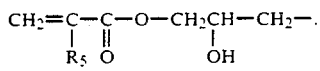

wherein $R_5$ represents a hydrogen atom or a methyl group; and (C) at least one polymerization initiator used in an amount of not larger than 1 wt % of the total of the compounds of (A) and (B) provided that when two or more initiators are used, the total amount of the two or more initiators is within a range of from 0.01 to 5 wt % of the compounds of (A) and (B), the cured resin product having a glass transition temperature not lower than 150° C. Preferably, a protective layer or a reflective layer is formed on the recording film.

BRIEF DESCRIPTION OF THE DRAWINGS

FIGS. 3a and 3b are, respectively, a plan view of a simple mold for an optically transparent substrate of a disk form and a sectional view taken along the line A—A' of FIG. 3a.

DETAILED DESCRIPTION AND EMBODIMENTS OF THE INVENTION

Figure 1:
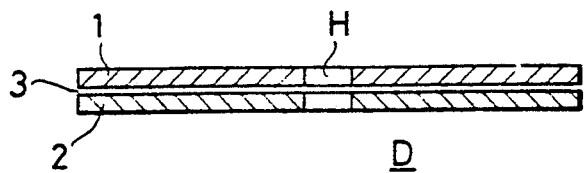
FIG. 1 is a sectional view of a recording and erasing optical disk according to the present invention.

In the formula (I), x is an integer of from 2 to 6 and the respective $R_2$s are a hydrogen atom or a methyl group. Preferably, $R_2$s should not be either all of a hydrogen atom or all of a methyl group, but some $R_2$s should be a hydrogen atom and the others should be a methyl group. This is because if all $R_2$s are a methyl group, the heat stability of a final product tends to lower as compared with the case where some $R_2$s are a methyl group and the others are a hydrogen group. In contrast, when all $R_2$s are a hydrogen atom, a chemical resistance and a glass transition temperature are apt to lower. Especially, when x in the formula (I) is 2, it is preferred that one $R_2$ is a hydrogen atom and the other $R_2$ is a methyl group, by which monoacrylate-monomethacrylate compounds are obtained.

Specific and preferable examples of the polyfunctional acrylate or methacrylate compounds (hereinafter referred to simply as (meth)acrylate compounds for acrylate and methacrylate compounds and also for acrylate-methacrylate compounds which mean acrylate and methacylate moieties are contained in one molecule of the compound) of the general formula (I) include 2,2'-bis[4-(beta(meth)acryloyloxy)cyclohexyl]-propane, 2,2'-bis[4-(beta(meth)acryloyloxydiethoxy)-cyclohexyl]propane, bis(oxymethyl)tricyclo[5.2.1.0$^{2,6}$]-decanedi(meth)acrylate, 1,4-bis((meth)acryloyloxymethyl)cyclohexane, trimethylolpropanetri(meth)acrylate, neopentylglycol di(meth)acrylate, 1,6-hexanediol di(meth)acrylate, diethylene glycol di(meth)acrylate, and the like. These compounds may be used singly or in combination. Of these, bis(oxymethyl)tricyclo[5.2.1.0$^{2,6}$]decane di(meth)acrylate compounds, used singly or in combination, are preferred. More preferably, a bis(oxymethyl)tricyclo[5.2.1.0$^{2,6}$]decane monoacrylate-monomethacrylate compound is used.

In the practice of the invention, the optically transparent substrate may be made of a cured product of the compound or compounds of the formula (I) alone as a polymerizable compound. Preferably, the compound of the formula (I) is used in combination with at least one copolymerizable or reactive compound selected from N-substituted maleimide compounds of the aforeindicated general formula (II) and epoxy-novolac acrylate or methacylate compounds of the afore-indicated general formula (III).

The reactive N-substituted maleimide compounds of the general formula (II) should preferably have, as the N-substituent, N-cyclohexyl, N-2,6-diethyphenyl, N-o-chlorophenyl, N-phenyl, or N-lauryl.

The N-substituted maleimide compounds of the general formula (II) and the epoxy-novolac (meth)acrylate compounds of the general formula (III) may be used singly or in combination. If used, the compounds of the general formula (II) and (III) are employed in a total amount of up to 40 wt % of the total of the reactive compounds of the formulae (I) and (II) and/or (III). In view of the solubility in the polyfunctional (meth)acrylate compound of the general formula (I) and the mechanical strength of a final cured product, the compounds of the formulae (II) and/or (III), are preferably used in an amount of from 5 to 30 wt % of the total amount of the reactive compounds.

The reactive compound or compounds of the general formulae (I) alone or in combination with the compound of the general formula (II) and/or (III) may be polymerized by application of heat, actinic light (UV rays) or heat and actinic light in combination. The resultant polymer or copolymer should be cured by application of heat or actinic light and crosslinked. For this purpose, any known thermal or photo-polymerization techniques may be used without limitations. For the polymerization process, known polymerization initiators and particularly, radical polymerization initiators are used. Examples of such initiators include peroxides such as benzoyl peroxide, diisopropyl peroxycarbonate, lauroyl peroxide, tertiary butyl peroxypivlate and the like, azo compounds such as azobisisobutyronitrile, photosensitizers such as benzophenone, benzoin ethyl ether, benzyl, acetophenone, anthraquinone and the like, sulfur compounds such as thioxanthone, and mixtures thereof.

The amount of the initiator is 1 wt % or below of the total amount of the starting reactive compounds used when only one initiator is used. If two or more initiators are used, the total amount of the initiators should be within a range of from 0.01 to 5 wt % provided that each initiator should be within a range of not larger than 1 wt %. More preferably, the amount of one initiator is in the range of from 0.1 to 0.5 wt %.

The polymerization is effected, for example, at a temperature of from 0° to 300° C., preferably from 20° to 250° C. in an atmosphere of air or an inert gas with or without irradiation of actinic light such as UV light. As a result, the reactive compound or compounds of the general formulae (I) and (II) and/or (III) are polymerized or precured, and the resultant polymer is subsequently cured to form a crosslinked product.

The resultant cured resin product has generally a glass transition temperature not lower than 150° C., by which when a disk substrate is formed of the cured resin product, 100,000 or more recording and erasing cycles are ensured. This disk substrate can stand practical use.

In order to obtain a disk substrate which has a more stable moldability and a higher heat resistance or a glass transition temperature higher than 200° C., the compound of the general formula (I) should preferably be bis(oxymethyl)tricyclo[5.2.1.0$^{2,6}$]decane dimethacrylate and/or diacrylate, and the N-substituted maleimide compound of the general formula (II) and/or the epoxy-novolac (meth)acrylate compound of the general formula (III) should be used in a total amount of up to 40 wt %, preferably from 5 to 30 wt %, of the reactive compounds totally used. More preferably, the compound of the formula (I) should be bis(oxymethyl)tricyclo[5.2.1.0$^{2,6}$]decane monoacrylate-monomethacrylate.

The compounds of the general formulae (I), (II) and (III) are all liquid and low in viscosity. When these starting liquid materials are filtered, foreign matters in the liquid materials can be almost completely removed. In addition, these starting compounds can be cured within a far shorter time than epoxy resins because of the radical polymerization, i.e. the precuring time of the compounds according to the invention is several tens seconds to several tens minutes but that of the epoxy resin is several hours. Because any OH groups are not formed during the curing reactions, the resultant cured product readily releases from a mold, thus leading to a shortened production time. Moreover, the starting compounds are in the form of a liquid having a low viscosity, so that they can be molded at an atmospheric pressure or at a slightly higher pressure of, at most, 1 kg/cm$^2$. This is contrary to the case of an injection molding technique in which a resin melt is applied onto a groove transfer stamper under a very high pressure at the time of the molding. Accordingly, a simple mold, such as a glass mold, may be used for fabrication of the cured resin substrate according to the invention. A small-sized apparatus is sufficient to make the substrate with the reduction in costs of the apparatus. Because of the small size, the apparatus is suitable for use in a clean room, enabling one to reduce a space for installation of the apparatus and to improve the workability. In addition, the life of a groove stamper can be significantly extended, resulting in a considerable reduction in disk costs.

The disk substrate of a cured polymer or resin product from the reactive compound or composition according to the invention has a remarkably higher heat resistance than known resin substrates. Accordingly, any thermal insulating layers of inorganic materials for protecting the substrate are not necessary. The structure of a final disk becomes simple and the productivity increases with a cost reduction since the formation step for the thermal insulating layer is not necessary and a sputtering apparatus for the inorganic, thermal insulating layer is not used. Moreover, the resin substrate obtained in the present invention is substantially free of any foreign matters, and a starting liquid mixture for the substrate rarely undergoes orientation of molecules during curing. The resultant substrate involves only a reduced degree of birefrigence and has good optical characteristics. Thus, the substrate is very reliable in all respects.

Figure 2:
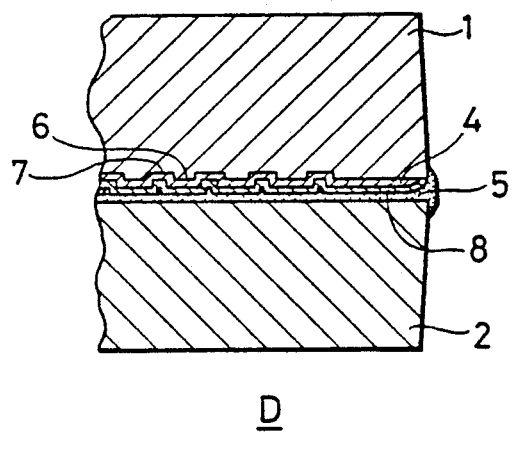
FIG. 2 is an enlarged sectional view of an end portion of the disk shown in FIG. 1.

Reference is now made to the accompanying drawings and particularly, to FIGS. 1 and 2, in which an optical disk is generally shown as D. In FIG. 1, there is shown the disk D which has an optically transparent substrate 1 of a disk form and a heat-resistant substrate 2 for protecting the recording layer with a gap 3 being formed therebetween. This heat-resistant substrate 2 may not be essential in the practice of the invention but is preferably used. Reference numeral H is a hole for receiving a shaft in recording and erasing operations. FIG. 2 more particularly shows the disk D, in which the transparent substrate 1 has a spiral recording groove or concentric recording grooves 6 on one side on which a recording film 4 of a known material such as tellurium oxide, germanium oxide, tin oxide or the like is formed, for example, by sputtering in thickness of approximately 200 to 1500 angstroms. Reference numeral 7 indicates tracking grooves. The transparent substrate 1 and the heat-resistant substrate 2 are bonded through an adhesive 5 such as, for example, a photo-curing epoxy resin. Preferably, a film 8 of ZnS or SiO$_2$ may be further formed by sputtering after the formation of the recording film 4, for example, in a thickness of not larger than 400 angstroms. The film 8 serves as an optical gap, by which a difference in reflectance or transmittance becomes more pronounced with a good C/N value. It will be noted that ZnS exhibits a good protective performance and SiO$_2$ has a good film-forming property.

Figure 3A:
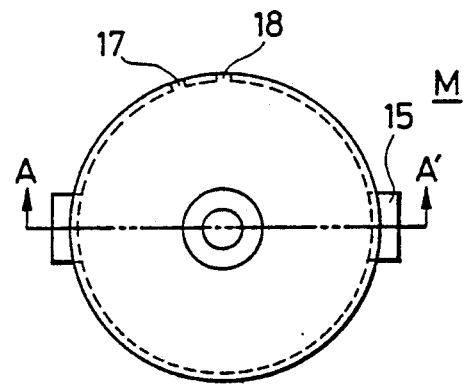
Figure 3B:
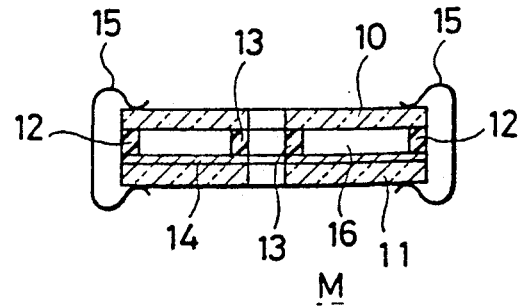

A mold for fabricating the optically transparent substrate 1 is particularly shown in FIGS. 3a and 3b. In the figures, the mold is generally shown as M. The mold M has a glass plate 10 and a glass plate 11 for attaching a nickel stamper 14. The glass plates 10, 11 are facing each other through silicone rubber spaces 12, 13 and are fixed with clamps 15, by which a space 16 is established between the glass plates 10, 11 into which a starting liquid composition is charged. Reference numerals 17, 18 are ports through which the starting liquid mixture is charged.

In operation, the staring liquid composition is charged through the ports 17, 18 into the space 16. After completion of the charging, the mold is heated to, for example, about 80° C. at which the liquid composition is precured or polymerized. At this precured or partially cured stage, the content is removed from the mold and postcured at 150° to 300° C. for 0.5 to about 6 hours to obtain a substrate of a cured-by-crosslinkage resin product. This postcuring is preferably effected in a stepwise manner where a higher temperature is ordinarily used at a later stage. The heat-resistant substrate 2 may be likewise made of a similar liquid composition using a mold of the same type as described above except that the nickel stamper-bearing glass plate 11 is replaced by a stamper-free glass plate.

The present invention is more particularly described by way of examples. Comparative examples are also shown.

EXAMPLES 1, 2 AND COMPARATIVE EXAMPLES 1-3

Starting reactive liquid composition Nos. 1 and 2 which were comprises of compounds with the molecular structure indicated in Table 1 and a thermal polymerization initiator (benzoyl peroxide) used in an amount of 1.0 wt % of the total amount of the compounds were each charged into a mold of the type shown in FIGS. 3a and 3b. After completion of the charging, the composition was precured at 80° C. and removed from the mold. The thus removed molding product was postcured at 80° C. for 2 hours and then at 150° C. for 1.5 hours, thereby obtaining a cured-by-crosslinkage resin substrate.

Thereafter, a TeOx recording film was formed by sputtering on the grooved side of the substrate in a thickness of 400 angstroms, followed by sputtering an optical gap ZnS layer in a thickness of 400 angstroms in a usual manner, thereby obtaining two types of optical disks.

For comparison, an epoxy resin (Comparative Example 1), a polycarbonate resin (Comparative Example 2), and a polymethyl methacrylate (Comparative Example 3) were each used to form an optical transparent, grooved substrate in a usual manner.

Thereafter, the procedure of the above examples was repeated to form a recording film and a ZnS film on the grooved surface of the substrate, thereby obtaining optical disks.

The disks of Examples 1, 2 and Comparative Examples 1-3 were subjected to a recording/erasing cycle test using laser beams. The results including a glass transition temperature are shown in Table 2.

TABLE 1

| Molecular Structure of Compounds | Amount (wt %) |
| --- | --- |
| Example 1 | |
| a) $CH_2=C(CH_3)-CO+OC_2H_4\!\!+\!\!_nO-\!\!\bigcirc\!\!-C(CH_3)(CH_3)-\!\!\bigcirc\!\!-O+C_2H_4O+\!\!_nOC-C(CH_3)=CH_2$ | 70 |
| b) $C_2H_5-C+CH_2OOC-C(CH_3)=CH_2)_3$ | 30 |
| Example 2 | |
| a) $CH_2=C(CH_3)-CO-O-CH_2-\!\!\bigcirc\!\!\bigcirc\!\!-CH_2-O-OC-C(CH_3)=CH_2$ | 80 |
| b) $CH_2=C(CH_3)-COOCH_2-C(CH_3)(CH_3)-CH_2OOC(CH_3)=CH_2$ | 20 |

TABLE 2

| | Glass Transition Temperature | Recording/Erasing Cycles | Remarks | Evaluation |
| --- | --- | --- | --- | --- |
| Example: | | | | |
| 1 | 167° C. | $10^5$ | substrate warped slightly poor impact strength | good |
| 2 | 273° C. | $10^6$ | good transparency slight degree of warpage | good |
| Comparative Example: | | | | |
| 1 | 135° C. | $10^3$ | poor releasing property releasing agent needed | moderate |
| 2 | 135° C. | 50 | large birefrigence large content of | bad |

TABLE 2-continued

| | Glass Transition Temperature | Recording/Erasing Cycles | Remarks | Evaluation |
|---|---|---|---|---|
| 3 | 110° C. | 10 | foreign matters in the disk high water absorption | bad |

The above results reveal that the disks using the thermoplastic resin substrates (Comparative Examples 2 and 3) have only a very short life, i.e. 50 or below recording and erasing cycles. Although the polycarbonate substrate has the same glass transition temperature as the thermoset epoxy resin, the disk using the epoxy resin has a longer recording/erasing cycle life, revealing that the crosslinkage is important for the cycle life. In contrast to these disk for comparison, the disk of the invention using specific types of methacrylate compositions have a significantly longer cycle life. It will be seen that a higher glass transition temperature results in a longer cycle life. In this connection, it was experimentally confirmed that a better cycle life was obtained when a cured product for the substrate had a glass transition temperature not lower than 200° C.

In the following examples and comparative examples, cured polymer porducts of various compositions of the compounds of the formulae (I) and/or (II) or (III) for an optically transparent substrate of an erasable optical disk were evaluated with respect to optical characteristics, heat resistance characteristics, warpage and overall evaluation.

The heat resistance characteristics were evaluated by subjected each sample to measurements of a thermogravimetric analysis and an differential thermal analysis to determine a glass transition temperature (Tg) and temperatures at which the weight losses of the sample by 10%, 20% and 50% occurred as determined by the thermogravimetric analysis. The optical characteristics were evaluated by making a 1.5 mm thick flat plate and subjecting to measurements of a light transmittance at 810 nm and a birefrigence (single pass).

In addition, a degree of warpage was evaluated by making a flat test plate from each composition, and fixing the plate at one end on a flat base plate to determine a height from the base plate at the other side of the test plate. Good: below 0.2 mm, moderate: 0.2-1 mm, and poor: over 1 mm.

The overall evaluation is made as follows: when a material for the disk substrate had a glass transition temperature of about 250° C. or over, a temperature at the time of a weight loss of 10% of not lower than 350° C., and a degree of warpage below 0.2 mm, it was evaluated as "o"; and materials whose characteristics were outside the above ranges were evaluated as "Δ" or "x".

EXAMPLES 3-12 AND COMPARATIVE EXAMPLES 4, 5

Bis(oxymethyl)tricyclo[5.2.1.0$^{2,6}$]decane dimethacrylate (hereinafter abbreviated as BTCDMA) and neopentyl glycol diacrylate (hereinafter abbreviated as NPGDA) were used as a polyfunctional (meth)acrylate compound, to which an epoxy-novolac acrylate compound (hereinafter abbreviated as ENA) was added in different amounts. Further, benzoyl peroxide was used as a radical polymerization initiator and/or Irgacure 184 (1-hydroxycyclohexyl phenyl ketone, made by Ciba-Geigy A.G.) was used as a photosensitizer. Each composition was precured at 80° C. for 50 minutes or by irradiation of a UV ray having a wavelength of 365 nm to an integrated light quantity of 10,000 mJ/cm$^2$. Postcuring was effected at 150° C. for 2 hours and at 250° C. for 1 hour in a stream of nitrogen at 0.5 liters/minute while evacuating with a rotary vacuum pump, thereby obtaining a cured polymer product. The UV irradiating apparatus used was Jet Light, JL-3300, made by Oak Seisakusho K. K.

The test results are shown in Table 3.

TABLE 3

| | Amounts (Parts by Weight) | | | Amounts of Polymerization Initiator Based on Total Monomers | | Manner of Polymerization | | Optical Characteristics | |
|---|---|---|---|---|---|---|---|---|---|
| | BTCDMA | NPGDA | ENA | BPO (wt %) | Irgacure 184 (wt %) | Precure | Postcure | Birefringence (nm) | Light transmittance (%) |
| Example: | | | | | | | | | |
| 3 | 60 | 40 | 50 | 0.5 | 0 | thermal | thermal | 0-8 | 91 |
| 4 | 60 | 40 | 25 | 0.5 | 0 | thermal | thermal | 0-5 | 91 |
| 5 | 60 | 40 | 5 | 0.5 | 0 | thermal | thermal | 0-3 | 91 |
| 6 | 60 | 40 | 0 | 0.5 | 0 | thermal | thermal | 0-3 | 92 |
| 7 | 60 | 40 | 50 | 0.5 | 0.5 | UV | thermal | 0-5 | 91 |
| 8 | 60 | 40 | 25 | 0.5 | 0.5 | UV | thermal | 0-3 | 91 |
| 9 | 60 | 40 | 5 | 0.5 | 0.5 | UV | thermal | 0-3 | 91 |
| 10 | 60 | 40 | 0 | 0.5 | 0.5 | UV | thermal | 0-3 | 92 |
| 11 | 60 | 10 | 50 | 0.5 | 0.5 | UV | thermal | 0-5 | 91 |
| 12 | 60 | 40 | 50 | 0.5 | 0.3 | UV | thermal | 0-3 | 91 |
| Comparative Example: | | | | | | | | | |
| 4 | 60 | 40 | 50 | 3 | 0 | thermal | thermal | 5-10 | 92 |
| 5 | 60 | 40 | 50 | 0 | 3 | UV | UV | 0-10 | 92 |

| Heat Resistance | |
|---|---|
| Glass Transition | Weight Loss |

TABLE 3-continued

|  | Temp. (°C.) | Temperature −10% | −20% | −50% | Warpage | Overall Evaluation |
|---|---|---|---|---|---|---|
| Example: | | | | | | |
| 3 | 275 | 412 | 426 | 450 | good | o |
| 4 | 268 | 393 | 407 | 438 | good | o |
| 5 | 257 | 360 | 384 | 421 | good | o |
| 6 | 250 | 335 | 353 | 396 | good | o-Δ |
| 7 | 273 | 411 | 426 | 450 | good | o |
| 8 | 268 | 391 | 408 | 441 | good | o |
| 9 | 256 | 357 | 381 | 417 | good | o |
| 10 | 250 | 335 | 353 | 396 | good | o-Δ |
| 11 | 279 | 415 | 431 | 455 | good | o |
| 12 | 274 | 412 | 425 | 450 | good | o |
| Comparative Example: | | | | | | |
| 4 | 255 | 403 | 416 | 438 | bad | x |
| 5 | 203 | 357 | 376 | 401 | bad | x |

EXAMPLES 13-21 AND COMPARATIVE EXAMPLES 6-9

The general procedure of Examples 3 to 12 was repeated except that bis(oxymethyl)tricyclo[5.2.1.0$^{2,6}$]-decane monoacrylmonomethacrylate (hereinafter abbreviated as BTDMA) and trimethylolpropane triacrylate (hereinafter abbreviated as TMPTA) were used as the compound of the formula (I), to which N-cyclohexylmaleimide (hereinafter abbreviated as CMI), N-laurylmaleimide (hereinafter abbreviated as LMI), N-2,6-diethylphenylmaleimide (hereinafter abbreviated as DEPMI), N-o-chlorophenylmaleimide (hereinafter abbreviated as CPMI), and/or N-phenylmaleimide (hereinafter abbreviated as PMI) were added in amounts indicated in Table 4 below.

The results are shown in Table 4 below.

TABLE 4

| | Amounts (Parts by Weight) | | | | | | | Amounts of Polymerization Initiator Based on Total Monomers | | Manner of Polymerization | |
|---|---|---|---|---|---|---|---|---|---|---|---|
| | BTDMA | THPTA | CMI | LMI | DEPMI | CPMI | PMI | BPO (wt %) | Irgacure 184 (wt %) | Precure | Postcure |
| Example: | | | | | | | | | | | |
| 13 | 60 | 40 | 10 | — | — | — | — | 0.5 | 0.5 | UV | thermal |
| 14 | 60 | 40 | 10 | — | — | — | — | 0 | 0.5 | UV | thermal |
| 15 | 60 | 40 | 30 | — | — | — | — | 0 | 0.5 | UV | thermal |
| 16 | 60 | 40 | 55 | — | — | — | — | 0 | 0.5 | UV | thermal |
| 17 | 60 | 40 | — | — | 30 | — | — | 0.5 | 0.5 | UV | thermal |
| 18 | 60 | 40 | — | — | — | 30 | — | 0.5 | 0.5 | UV | thermal |
| 19 | 60 | 40 | — | — | — | — | 30 | 0.5 | 0.5 | UV | thermal |
| 20 | 60 | 40 | — | — | 30 | — | — | 0 | 0.5 | UV | thermal |
| 21 | 60 | 40 | — | — | 10 | — | — | 0.5 | 0.5 | UV | thermal |
| Comparative Example: | | | | | | | | | | | |
| 6 | 60 | 40 | — | — | — | — | — | 0.5 | 0.5 | UV | thermal |
| 7 | 60 | 40 | 30 | — | — | — | — | 5 | 2 | UV | thermal |
| 8 | 60 | 40 | 30 | — | — | — | — | 0 | 5 | UV | thermal |
| 9 | 60 | 40 | 30 | — | — | — | — | 3 | 3 | UV | thermal |

| | Optical Characteristics | | Heat Resistance | | | | | |
|---|---|---|---|---|---|---|---|---|
| | Birefringence (nm) | Light Transmittance (%) | Glass Transition Temp. (°C.) | Weight Loss Temperature | | | Warpage | Overall Evaluation |
| | | | | −10% | −20% | −50% | | |
| Example | | | | | | | | |
| 13 | 0-2.5 | 92.0 | 251 | 348 | 387 | 409 | good | o |
| 14 | 0-2.5 | 92.3 | 250 | 352 | 391 | 411 | good | o |
| 15 | 0-3 | 92.7 | 251 | 357 | 394 | 425 | good | o |
| 16 | 0-2 | 93.0 | 255 | 359 | 397 | 432 | good | o |
| 17 | 0-2.3 | 92.8 | 250 | 351 | 398 | 405 | good | o |
| 18 | 0-3 | 92.6 | 257 | 353 | 405 | 420 | good | o |
| 19 | 0-7 | 91.5 | 263 | 351 | 411 | 445 | good | o-Δ |
| 20 | 0-2.6 | 92.4 | 254 | 352 | 395 | 406 | good | o |
| 21 | 0-2.7 | 92.1 | 248 | 347 | 391 | 400 | good | o-Δ |
| Comparative Example: | | | | | | | | |
| 6 | 0-3 | 91.8 | 230 | 317 | 353 | 397 | good | x |
| 7 | 2-10 | 90.8 | 248 | 335 | 371 | 405 | bad | x |
| 8 | 5-8 | 92.5 | 250 | 344 | 389 | 421 | bad | x |
| 9 | 3-10 | 91.6 | 246 | 341 | 385 | 417 | bad | x |

From Tables 3 and 4, it will be seen that when the compounds of the formula (II) or (III) are used in amounts up to approximately 40 wt % of the total amount of the reactive compounds, good results are obtained with respect to the optical characteristics, heat resistance and warpage. Moreover, the amounts of radical polymerization initiators and photosensitizers give a great influence on the characteristic properties of the final cured products. More particularly, if these initiators are used singly, the amount should be not larger than 1 wt % of the total amount of reactive compounds used, two or more initiators are used, the total amount of the initiators should be in the range of from 0.01 to 5 wt %.

What is claimed is:

1. A cured polymer product of a composition which comprises:

(A) an acrylate or methacrylate compound of the following general formula (I)

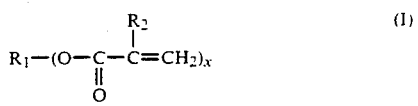

in which $R_1$ represents an alcohol residue having from 2 to 50 carbon atoms, $R_2$ represents a hydrogen atom or a methyl group, and x is an integer of from 2 to 6;

(B) at least one compound selected from the group consisting of N-substituted maleimide compounds of the following general formula (II) and epoxynovolac methacrylate/acrylate compounds of the following general formula (III), said at least one compound being included in an amount not greater than 40 weight percent based on the total of the compounds (A) and (B)

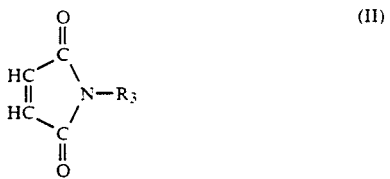

in which $R_3$ represents a cyclohexyl group, a lauryl group, a 2,6-diethylphenyl group, an o-chlorophenyl group or a phenyl group,

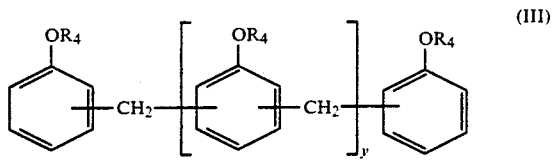

in which each $R_4$ represents a group of the formula,

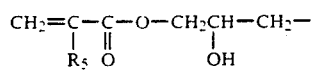

wherein $R_5$ represents a hydrogen atom or a methyl group; and (C) at least one polymerization initiator, wherein when only one initiator is used it is included in an amount of not larger than 1 wt % of the total of the compounds of (A) and (B), and when two or more initiators are used, the total amount of the two or more initiators is within a range of from 0.01 to 5 wt % of the total of the compounds of (A) and (B), the cured product having a glass transition temperature of not less than 150° C.

2. A cured polymer product according to claim 1, wherein when x is 2 in the general formula (I), one $R_2$ represents a hydrogen atom and the other $R_2$ represents a methyl group.

3. A cured polymer product according to claim 1, wherein the compound of the general formula (I) is 2,2'-bis[4-(beta(meth)acryloyloxy)cyclohexyl]-propane, 2,2'-bis[4-(beta(meth)acryloyloxydiethoxy)-cyclohexyl]propane, bis(oxymethyl)tricyclo[$5.2.1.0^{2,6}$]-decane di(meth)acrylate, 1,4-bis((meth)acryloyloxymethyl)cyclohexane, trimethylolpropanetri(meth)acrylate, neopentylglycol di(meth)acrylate, 1,6-hexanediol di(meth)acrylate, or diethylene glycol di(meth)acrylate.

4. A cured polymer product according to claim 3, wherein said compound is a bis(oxymethyl)tricyclo[$5.2.1.0^{2,6}$]decane diacrylate compound.

5. A cured polymer product according to claim 3, wherein said compound is a bis(oxymethyl)tricyclo[$5.2.1.0^{2,6}$]decane dimethacrylate compound.

6. A cured polymer product according to claim 3, wherein said compound is a mixture of a bis(oxymethyl)tricyclo[$5.2.1.0^{2,6}$]decane acrylate compound and a bis(oxymethyl)tricyclo[$5.2.1.0^{2,6}$]decane dimethacrylate compound.

7. A cured polymer product according to claim 3, wherein said compound is a bis(oxymethyl)tricyclo[$5.2.1.0^{2,6}$]decane monoacrylate-monomethacrylate compound.

8. A cured polymer product according to claim 3, wherein said compound is a mixture of a bis(oxymethyl)tricyclo[$5.2.1.0^{2,6}$]decane diacrylate compound, a bis(oxymethyl)tricyclo[$5.2.1.0^{2,6}$]decane dimethacrylate compound and a bis(oxymethyl)tricyclo[$5.2.1.0^{2,6}$]decane monoacrylate-monomethacrylate compound.

9. A cured polymer product according to claim 1, wherein the amount of the at least one compound in (B) is in the range of from 5 to 30 wt % of the total amount of the compounds used in (A) and (B).

10. A cured polymer product according to claim 1, wherein the at least one compound in (B) is an N-substituted maleimide compound of the general formula (II).

11. A cured polymer product according to claim 1, wherein the at least one compound in (B) is an epoxynovolac methacrylate/acrylate compound of the general formula (III).

* * * * *